UNITED STATES PATENT OFFICE.

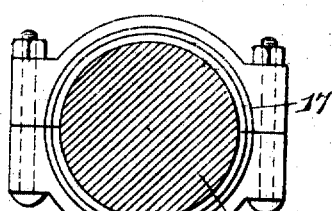
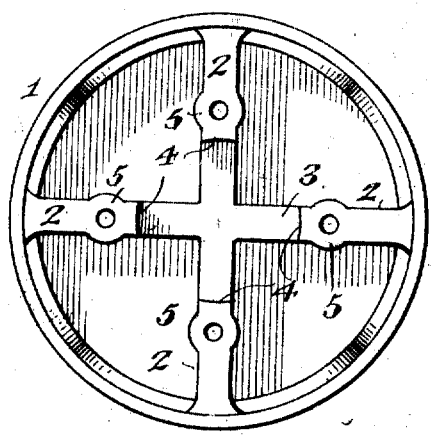
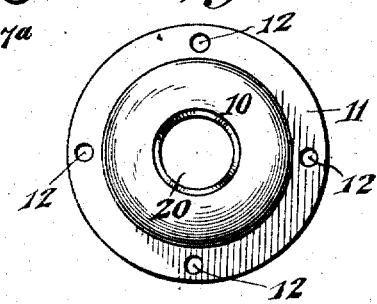
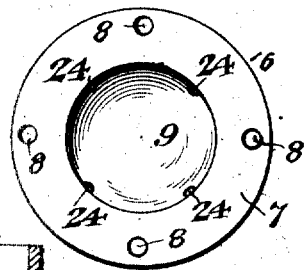
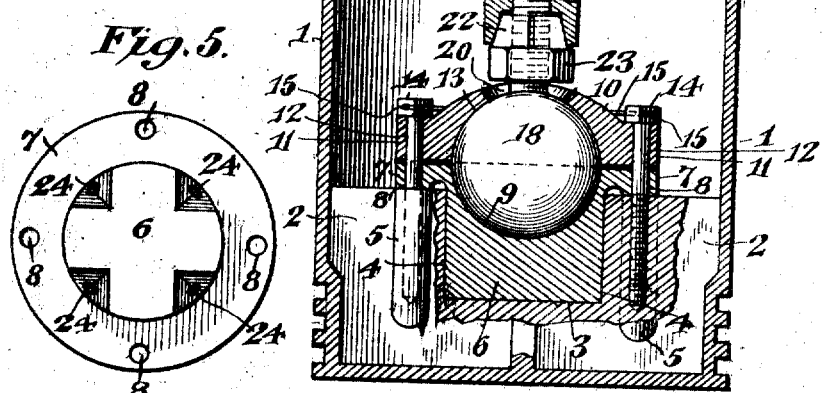

HENRY A. McGREGOR AND NATHANIEL KETCHAM, OF BAKERSFIELD, CALIFORNIA.

PISTON.

1,252,281.

Specification of Letters Patent.

Patented Jan. 1, 1918.

Application filed April 7, 1917. Serial No. 160,515.

*To all whom it may concern:*

Be it known that we, HENRY A. McGREGOR and NATHANIEL KETCHAM, citizens of the United States, residing at Bakersfield, in the county of Kern and State of California, have invented a new and useful Piston, of which the following is a specification.

This invention relates to pistons for internal combustion engines.

An object of the invention is to do away with the piston pin which is now used to a great extent and to provide in lieu thereof a ball bearing connection between the piston and the connecting rod or pitman, whereby very little power will be lost due to friction, and in which wear and tear will be to a great extent eliminated.

Another object of the invention is to provide a construction which will eliminate the necessity for reboring and regrinding the cylinders and which will not cramp or warp the piston because of the non-alinement of the piston within the cylinder due to the lack of flexibility between the piston and the connecting rod.

Another object of the invention is to provide a ball stud which is adjustably mounted upon the connecting rod whereby the compression space can be decreased or increased, allowing the motor to attain its highest efficiency of power through compression.

Another object of the invention is to provide a construction in which the connecting rod and bearings can be easily removed from the motor and replaced.

The invention has several advantages. For instance, the piston wall can be made of uniform thickness, whereby the expansion and contraction of the same will be uniform. If the cylinder walls should be out of alinement with the crank shaft, the piston will find its true alinement because of the flexibility of the connection between the same and the crank shaft.

Another advantage of the ball bearing connection resides in the fact that the piston is thereby allowed rotary motion which will keep the piston and cylinder walls in a perfectly round condition.

In the accompanying drawing, there has been illustrated one embodiment of the invention, in which:

Figure 1 is a longitudinal sectional view through a piston having one form of the invention connected thereto.

Fig. 2 is a plan view of the piston, looking into the open end thereof.

Fig. 3 is a plan view of one of the bearing members or cap.

Fig. 4 is a top plan view of the lower bearing member.

Fig. 5 is a bottom plan view of the lower bearing member.

In the embodiment of the invention here illustrated, a piston 1 of trunk construction and having walls of substantially uniform thickness is provided upon the interior thereof with a spider 2 comprising radially extending webs cast integral therewith. The central portions of the spider are cut away forming a recess 3, as shown in Fig. 2. The resulting vertical edges of the outer portions of the webs form shoulders or abutments 4. The recessed portion of the spider is machined in order to accurately receive one of two bearing members. The outer portions of the webs of the spider adjacent to the shoulders 4 are formed with bosses 5 which are drilled and tapped forming threaded openings for receiving cap screws.

A bearing member or block 6, preferably of bronze, is machined to fit firmly and securely in the recess 3 of the spider and against the shoulders 4 (Fig. 1). This bearing member is provided with a marginal flange 7 at one end which extends over and rests upon the outer portions of the spider, as shown in Fig. 1, and has openings 8 in alinement with the threaded openings within the bosses 5. The outer portion of the bearing member 6 is machined to provide a substantially semi-spherical recess or socket 9.

Fitting over the outer face of the bearing member 6 is a cap or coöperating bearing member 10 having a marginal flange 11 engaging the flange 7 of the bearing member 6. This flange is also provided with openings 12 in alinement with the openings 8 of the flange 6 and with the threaded openings within the bosses 5. As shown in Fig. 1, the inner portion of the cap is machined providing a semi-spherical recess or socket 13 which forms with the recess 9 a spherical socket which is as nearly perfect as can be made. The cap is, like the bearing member 6, preferably composed of bronze. The cap 10 with the member 6 is secured to the spider 2 by means of the cap screws 14 extending through the several openings, whereby a very strong rigid construction is obtained and one in which the bearing members will not rotate with reference to the piston. The cap screws are locked by wire 15 laced through the heads of the screws.

A connecting rod or pitman 16 is provided with journal-bearing devices 17 at one end for connecting the same to the crank shaft 17ª and at its opposite end is provided with a ball 18. This ball is preferably composed of drop forged steel which is machined to properly fit in the spherical socket of the bearing members in the piston and is perfectly round. The ball is provided with a stud 19 and is mounted within the spherical socket of the bearing members 6 and 10, the stud extending through a suitable opening 20 at the outer central portion of the cap 10. The stud 19 is threaded and is adjustably mounted within a threaded socket 21 in the end of the connecting rod or pitman. The ball and stud are adjustably locked in position upon the connecting rod by means of a split lock nut 22 comprising a nut portion 23 and a conical locking portion, said nut screwing upon the stud 19. The outer end of the rod 16 has a conical recess to receive the conical portion of the nut.

The construction above described provides a very serviceable piston and connection whereby the friction and wear and tear is reduced to a minimum, and in which the parts can be minutely adjusted and easily removed. The motion of the piston will keep the bronze bearing members uniformly cooled. The bronze ball bearing members will also be provided with shims, so as to be adjustable to wear. Lubricating openings 24 are provided in the socket.

The numerous advantages of this invention have been fully set forth above and need no elaboration here.

While we have shown and described one embodiment of the invention, it is to be understood that we do not desire to be limited to the details of construction herein shown and described for obvious modifications will be apparent to anyone skilled in the art.

What is claimed is:—

1. The combination with a piston, of a pair of coöperating bearing members divided transversely to the path of movement of said piston and provided with recesses which together form a spherical socket, a connecting rod provided at one end with a ball mounted between said bearing members and movable in said socket, and screws solely connecting the bearing members together and to the piston.

2. The combination with a piston having on its inner side an integral crossed web forming a spider, of bearing members having a spherical socket and removably mounted upon said spider the members being separated transversely to the path of movement of the piston, means concentrically of the socket for securing said members to said spider, and a connecting rod provided with a ball movably mounted in said socket.

3. The combination with a piston having a spider, a bearing member mounted upon said spider, a cap member mounted upon said bearing member, said members being provided with recesses providing a substantially spherical socket, means for clamping said members together and to the spider, and a connecting rod provided at one end with a ball movably mounted in said socket.

4. The combination with a piston having a spider, the central portions of said spider being cut away forming a recess, an inner bearing member mounted within said recess and provided with a semi-spherical outer recess and a flange overlapping the outer portions of said spider, a cap member provided with a semi-spherical inner recess forming with the first mentioned recess a spherical socket and adapted to fit upon said inner bearing member, means for securing said members to the spider, and a connecting rod provided with a ball at one end and movably mounted between said members in said socket.

5. The combination with a ball, of a connecting rod having a threaded socket and also provided with an inwardly tapered counterseat opening through one end of said rod, a threaded stud on the ball adjustably engaging in said socket, and a nut adjustable on the stud and having a split locking portion for engagement in the counterseat.

6. The combination with a piston having a spider therein comprising substantially radially extending webs, the central portions of said webs being cut away to form a recess, bosses provided with screw openings and formed upon said webs, a bearing member fitted in the recess of said spider, abutting the opposed edges of the outer portions of the spider and having a flange extending over said outer portions, a cap member mounted above said first-mentioned member and having a flange engaging the flange of said first-mentioned member, said members being recessed to provide a spherical socket therebetween and said flanges having openings therethrough in alinement with the openings in said bosses, screws extending through said openings for clamping said bearing members together and to said spider, and a connecting rod provided with an adjustable ball at one end movably mounted in said socket.

7. The combination with a rod provided with a threaded socket in one end, of a ball having a threaded stud adjustably engaging said threaded socket, and means for locking said stud in position, said means consisting of a nut having a conical split portion and a conical recess in the outer end of the rod to engage the said conical portion.

8. The combination of a piston having its interior provided with interior shoulders forming a recess, a block fitted in said recess between said shoulders and formed from a plurality of members providing a socket, the members being divided transversely to the longitudinal axis of the rod, means detachably fastening the members to the piston, and a connecting rod having a ball on its outer end mounted in said socket.

9. The combination with a piston having on its inner side a spider, of a sectional bearing divided transversely and removably mounted in said spider, means for securing said bearing to the spider, and a connecting rod having movable connection with said bearing.

In testimony, that we claim the foregoing as our own we have hereto affixed our signatures in the presence of two witnesses.

HENRY A. McGREGOR.
NATHANIEL KETCHAM.

Witnesses:
H. W. McCray,
Zella Replogle.